· US008769622B2

United States Patent
Chang et al.

(10) Patent No.: US 8,769,622 B2
(45) Date of Patent: Jul. 1, 2014

(54) AUTHENTICATION AND AUTHORIZATION METHODS FOR CLOUD COMPUTING SECURITY

(75) Inventors: David Yu Chang, Austin, TX (US); Messaoud Benantar, Austin, TX (US); John Yow-Chun Chang, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 13/173,563

(22) Filed: Jun. 30, 2011

(65) Prior Publication Data

US 2013/0007845 A1 Jan. 3, 2013

(51) Int. Cl.
*H04L 9/08* (2006.01)

(52) U.S. Cl.
USPC ................................ 726/4; 713/168

(58) Field of Classification Search
USPC .............................................. 726/4
See application file for complete search history.

(56) References Cited

U.S. PATENT DOCUMENTS

| | | | | |
|---|---|---|---|---|
| 7,437,310 | B1 * | 10/2008 | Dutta | 705/26.1 |
| 7,644,410 | B1 * | 1/2010 | Graupner et al. | 718/104 |
| 7,823,770 | B2 * | 11/2010 | Brown et al. | 235/376 |
| 8,260,931 | B2 * | 9/2012 | Balasubramanian et al. | 709/226 |
| 8,458,658 | B2 * | 6/2013 | Faus et al. | 717/121 |
| 2003/0037258 | A1 * | 2/2003 | Koren | 713/201 |
| 2008/0307506 | A1 | 12/2008 | Saldhana | |
| 2009/0228950 | A1 | 9/2009 | Reed et al. | |
| 2009/0228967 | A1 | 9/2009 | Gbadegesin et al. | |
| 2010/0076863 | A1 | 3/2010 | Golomb | |
| 2010/0132016 | A1 * | 5/2010 | Ferris | 726/4 |
| 2010/0161759 | A1 * | 6/2010 | Brand | 709/218 |
| 2010/0251328 | A1 * | 9/2010 | Syed et al. | 726/1 |
| 2010/0299313 | A1 * | 11/2010 | Orsini et al. | 707/652 |
| 2010/0319004 | A1 * | 12/2010 | Hudson et al. | 719/313 |

(Continued)

OTHER PUBLICATIONS

"Cloud Computing and Security—A Natural Match," Trusted Computing Group, Apr. 2010.

(Continued)

*Primary Examiner* — Carolyn B Kosowski
*Assistant Examiner* — Jason C Chiang
(74) *Attorney, Agent, or Firm* — Jeffrey S. LaBaw; David H. Judson

(57) ABSTRACT

An authentication and authorization plug-in model for a cloud computing environment enables cloud customers to retain control over their enterprise information when their applications are deployed in the cloud. The cloud service provider provides a pluggable interface for customer security modules. When a customer deploys an application, the cloud environment administrator allocates a resource group (e.g., processors, storage, and memory) for the customer's application and data. The customer registers its own authentication and authorization security module with the cloud security service, and that security module is then used to control what persons or entities can access information associated with the deployed application. The cloud environment administrator, however, typically is not registered (as a permitted user) within the customer's security module; thus, the cloud environment administrator is not able to access (or release to others, or to the cloud's general resource pool) the resources assigned to the cloud customer (even though the administrator itself assigned those resources) or the associated business information. To further balance the rights of the various parties, a third party notary service protects the privacy and the access right of the customer when its application and information are deployed in the cloud.

14 Claims, 6 Drawing Sheets

(56) References Cited

U.S. PATENT DOCUMENTS

| | | | |
|---|---|---|---|
| 2011/0016214 A1* | 1/2011 | Jackson | 709/226 |
| 2011/0055588 A1* | 3/2011 | DeHaan | 713/189 |
| 2011/0145153 A1* | 6/2011 | Dawson et al. | 705/80 |
| 2011/0231670 A1 | 9/2011 | Shevchenko et al. | |
| 2011/0246526 A1* | 10/2011 | Finkelstein et al. | 707/784 |
| 2011/0258317 A1* | 10/2011 | Sinha et al. | 709/226 |
| 2011/0276490 A1* | 11/2011 | Wang et al. | 705/50 |
| 2011/0289134 A1* | 11/2011 | de los Reyes et al. | 709/203 |
| 2011/0314532 A1* | 12/2011 | Austin et al. | 726/8 |
| 2011/0314533 A1 | 12/2011 | Austin et al. | |
| 2012/0035942 A1* | 2/2012 | Graupner et al. | 705/1.1 |
| 2012/0042162 A1* | 2/2012 | Anglin et al. | 713/165 |
| 2012/0096271 A1* | 4/2012 | Ramarathinam et al. | 713/172 |
| 2012/0102539 A1* | 4/2012 | Robb et al. | 726/1 |
| 2012/0117626 A1* | 5/2012 | Yates et al. | 726/4 |
| 2012/0131341 A1 | 5/2012 | Mane et al. | |
| 2012/0221454 A1* | 8/2012 | Morgan | 705/37 |
| 2012/0233315 A1* | 9/2012 | Hoffman et al. | 709/224 |
| 2012/0233668 A1* | 9/2012 | Leafe et al. | 726/4 |
| 2012/0254001 A1* | 10/2012 | Ran | 705/35 |

OTHER PUBLICATIONS

Timm et al, "Authentication, Authorization, and Contextualization in FermiCloud," 2010.

Shen et al, "The Security of Cloud Computing System enabled by Trusted Computing Technology," 2nd International Conference on Signal Processing Systems (ICSPS), 2010.

Celesti et al, "Three-Phase Cross-Cloud Federation Model: The Cloud SSO Authentication," 2010 Second International Conference on Advances in Future Internet, 2010.

International Search Report, PCT/CA2012/050422, Oct. 24, 2012.

* cited by examiner

AUTHENTICATION AND AUTHORIZATION METHODS FOR CLOUD COMPUTING SECURITY

BACKGROUND OF THE INVENTION

1. Technical Field

This disclosure relates generally to ensuring integrity, confidentiality and privacy of business information in an environment in which resources are hosted in a shared pool of configurable computing resources.

2. Background of the Related Art

User authentication is one function that service providers offer to ensure that users accessing resources (e.g., applications, web content, etc.) are authorized to do so. To ensure that a user is not an imposter, service providers (e.g., web servers) generally ask for a user's username and password to prove identity before authorizing access to resources. Single sign-on (SSO) is an access control mechanism which enables a user to authenticate once (e.g., provide a username and password) and gain access to software resources across multiple systems. Typically, an SSO system enables user access to resources within an enterprise or an organization. Federated Single Sign-on (F-SSO) extends the concept of single sign-on across multiple enterprises, thus establishing partnerships between different organizations and enterprises. F-SSO systems typically include application level protocols that allow one enterprise (e.g., an identity provider) to supply a user's identity and other attributes to another enterprise (e.g., a service provider).

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP.

While cloud computing provides many advantages, data security is a major concern. In particular, companies that desire to deploy their enterprise applications within a cloud environment often maintain and manage critical business information in association with such applications. When those applications are deployed in the cloud, necessarily that critical business information is exposed to the cloud computing service provider. As a consequence, that business information is at risk because, by its very nature, a cloud computing environment places the information within the administrative control of the cloud computing service provider. While technical and legal protections may exist, the integrity, confidentiality and privacy of the business information cannot be ensured absolutely. As just one example scenario, if the cloud service provider is acquired, the enterprise business information may be exposed to third parties, even potential competitors. This is untenable.

Until cloud provider customers can be assured that they can maintain security control over their business information, they will be hesitant about deploying their business-critical applications in a cloud computing environment. The subject matter of this disclosure addresses this problem.

BRIEF SUMMARY

This disclosure describes an authentication and authorization plug-in model for a cloud computing environment that enables cloud customers to retain control over their enterprise information when applications and that information are deployed in the cloud. To this end, the cloud service provider enables (e.g., through a plug-in service) an enterprise customer to plug-in (to the environment) and use the customer's own authentication and authorization security module.

The cloud service provider has a cloud environment administrator that allocates resource groups for customers that deploy applications to the cloud environment. When a customer deploys an application, the cloud environment administrator allocates a resource group (e.g., processors, storage, and memory) for the customer's application and data. The customer registers its authentication and authorization security module with the cloud security service, and that security module is then used to control what persons or entities can access information associated with the deployed application. The cloud environment administrator, however, is not registered (as a permitted user) within the customer's security module; thus, the cloud environment administrator is not able to access (or release to others, or to the cloud's general resource pool) the resources assigned to the cloud customer (even though the administrator itself assigned those resources) or the associated business information.

The plug-in security model ensures that the enterprise customer's information is secure. To facilitate this approach, a third party notary service is provided as an intermediary between the enterprise customer and the cloud provider. The third party notary service may be associated with one or more cloud providers, but it is a distinct and independent entity that is not under the cloud provider's control. The notary may be a government entity, a private entity, a public entity, or the like. The notary acts as a certifier (or, more generally, an authoritative third party) that can attest, preferably in an automated manner, to an agreement among the customer, the cloud provider, and the third party notary service. Among other provisions, that agreement provides that the resource group or groups (i.e., the cloud resources) assigned to the cloud customer can only be released for use by another customer in certain circumstances. One example circumstance is that both the cloud environment administrator and the cloud customer administrator login to approve the release, conditioned further upon a requirement that the contents (e.g., the customer's business information) be erased before such release. Another example circumstance is receipt of a login of a permitted notary user and the cloud environment administrator, which may occur in the event of the customer's breach of some obligation under the cloud service agreement. Even in this scenario, however, the release of the resource group is conditioned upon erasure of the (now former) customer's information. This approach ensures that the cloud environment administrator cannot unilaterally take back resources allocated to the customer and/or view customer-sensitive information, even in the event the customer breaches the service agreement and is to be terminated as a customer.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
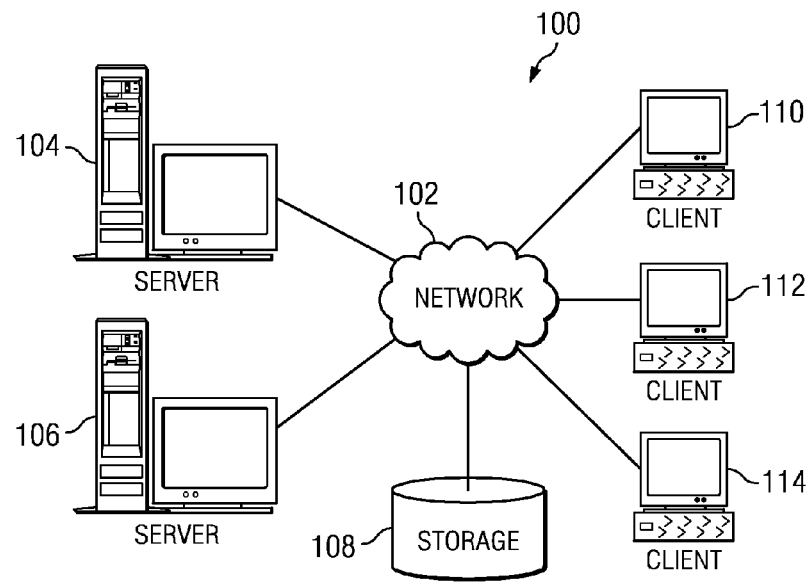
FIG. 1 depicts an exemplary block diagram of a distributed data processing environment in which exemplary aspects of the illustrative embodiments may be implemented.
Figure 2:
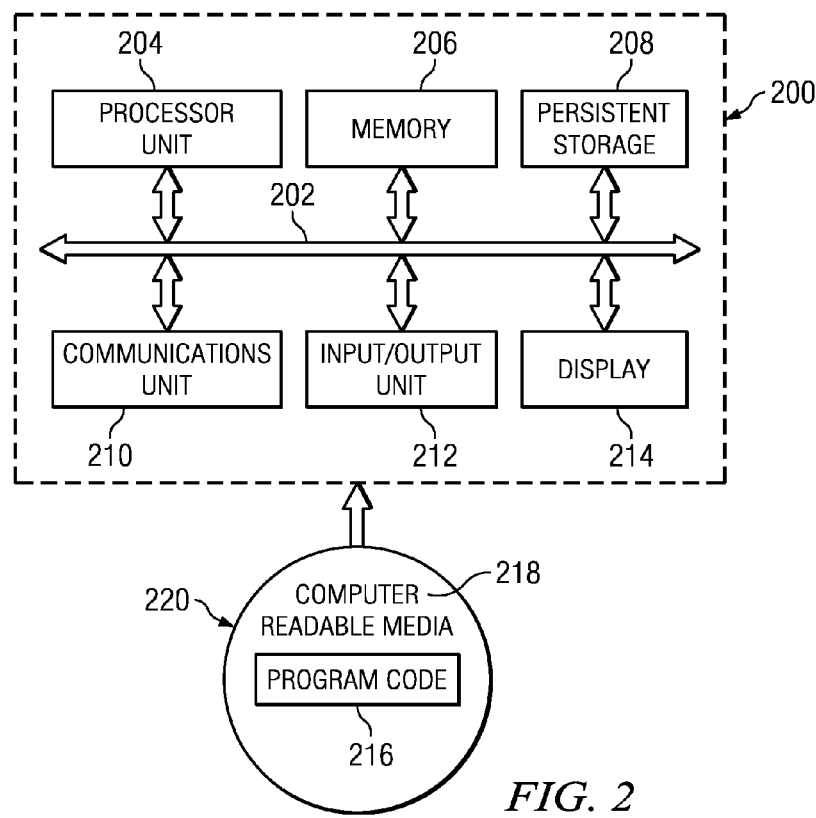
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The standard client-server paradigm such as illustrated in FIG. 1 is one in which client machines communicate with an Internet-accessible Web-based portal executing on a set of one or more machines. In particular, end-users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Federated SSO

Figure 3:
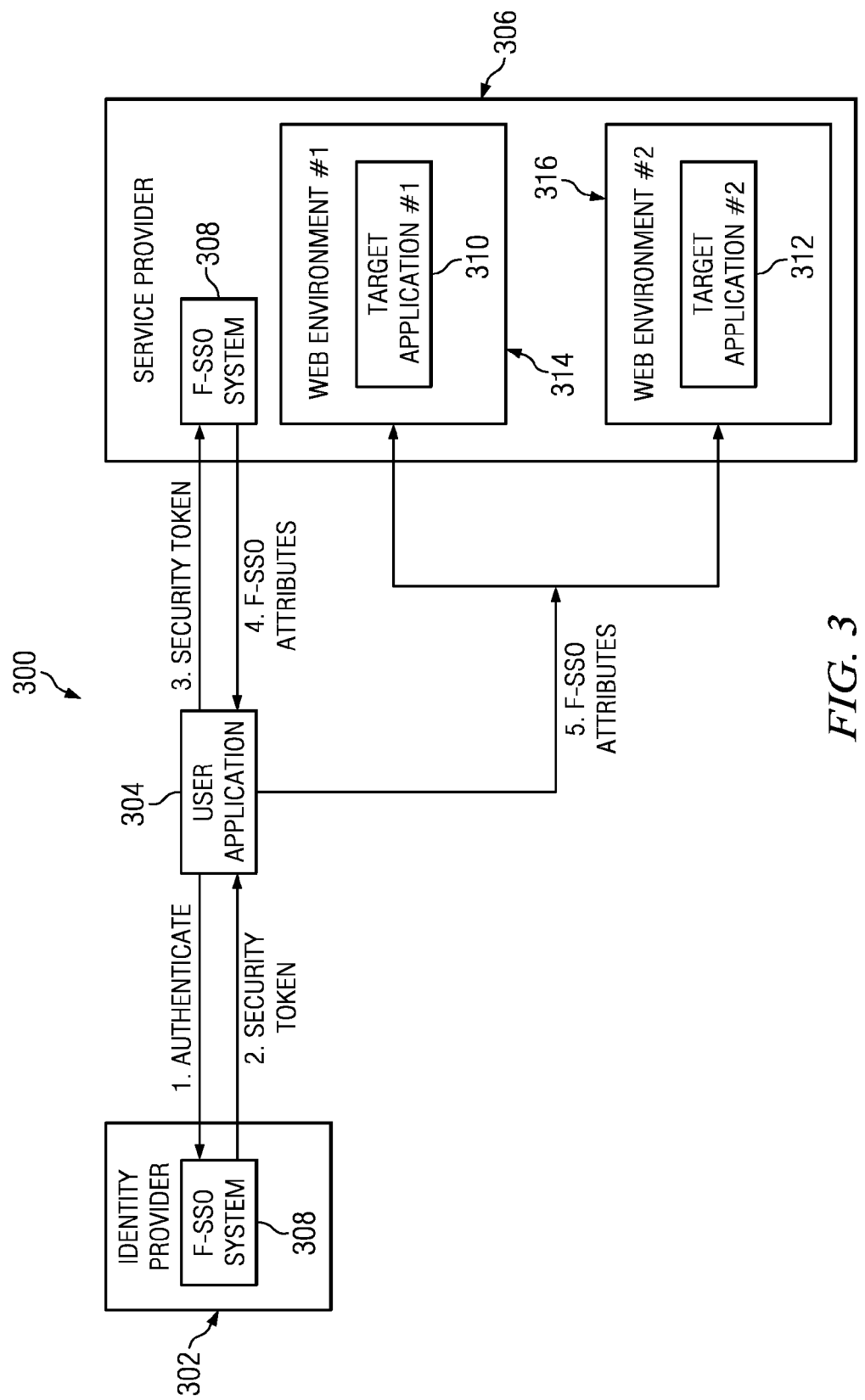
FIG. 3 is an exemplary block diagram illustrating a known Federated Single Sign-On (F-SSO) technique.

Single sign-on (SSO) is an access control mechanism which enables a user to authenticate once (e.g., by providing a user name and password) and gain access to software resources across multiple systems. Typically, an SSO system enables user access to resources within an enterprise or an organization. Federated single sign-on (F-SSO) extends the concept of single sign-on across multiple enterprises, thus establishing partnerships among different organizations and enterprises. F-SSO systems typically include protocols, such as SAML, that allow one enterprise (e.g., an identity provider) to supply a user's identity and other attributes to another enterprise (e.g., a service provider). In other words, an F-SSO system helps transport the user's credentials from the identity provider to the service provider in a trusted manner using a suitable protocol, typically HTTP. FIG. 3 is a block diagram illustrating the typical flow of operations in a known federated single sign-on (F-SSO) process. As shown in FIG. 3, the F-SSO process 300 involves communications between an identity provider 302, a user application 304, and a service provider 306. The identity provider 302 and the service provider 304 include an F-SSO system 308, which includes logic to authenticate a user, establish the user's credentials, and generate an encrypted security token (e.g., cookie) including user information. Additionally, the service provider 306 can also include one or more target applications 310 and 312. The target applications can reside within the same web environment or be a part of different web environments 314 and 316 (e.g., Apache, WebSphere® etc.) within the same service provider 306. The user application 304 can include logic (e.g., a web browser) to present content (e.g., web pages) to the user.

In one embodiment, the user application 304 first authenticates to the identity provider 302 (e.g., providing a username and password) as indicated by step 1. In step 2, the identity provider's F-SSO system 308 returns a security token to the user. This security token may be time-sensitive (e.g., can include a time stamp) and cryptographically signed. The security token can include the user's identity (e.g., username) and other attributes (e.g., user identification number) that the identity provider 302 wishes to provide to the service provider 306. The user application 304 can present the security token to the service provider's F-SSO system using any suitable technique (e.g., HTTP request) and message structure (e.g., using HTTP query strings, HTTP POST data, etc.) defined by the F-SSO protocol (refer to step 3). In step 4, the service provider's F-SSO system 308 validates the cryptographic signature of the security token to confirm the token's authenticity of origin and that the contents of the security token are trustworthy. The service provider's F-SSO system can also extract the user's identity and related attributes from the security token and generate an F-SSO attributes cookie including the user's identity and attributes.

After achieving single sign-on (i.e., conveying user attributes from the identity provider's F-SSO system to the service provider's F-SSO system), if the user wants to access a target application (e.g., 310) hosted by the service provider 306, the user application 304 may pass an F-SSO attributes cookie obtained from the service provider's F-SSO system 308 to the target application (refer to step 5). In the alternative, attributes may be stored at a proxy and passed as a user's request passes through the proxy so that cookies are not required. In this example embodiment, the transfer of user attributes (e.g., in an F-SSO cookie) is done in a trustworthy and secure manner and can be performed on the basis of F-SSO prescribed protocols (typically HTTP). If the data contained within an F-SSO attributes cookie is accepted and understood by the target application (e.g., if the target application can decrypt and retrieve the cookie's contents), the target application (e.g., e10) validates it and creates a session for the user. In some embodiments, the target applications (e.g., 310) understand the F-SSO attributes cookie, or they can be part of the F-SSO process (i.e., the target application may not include an F-SSO system).

The Cloud Computing Model

By way of additional background, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over systems and devices (e.g., operating systems, storage, deployed applications, etc.), and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party, and it may be implemented on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 4:
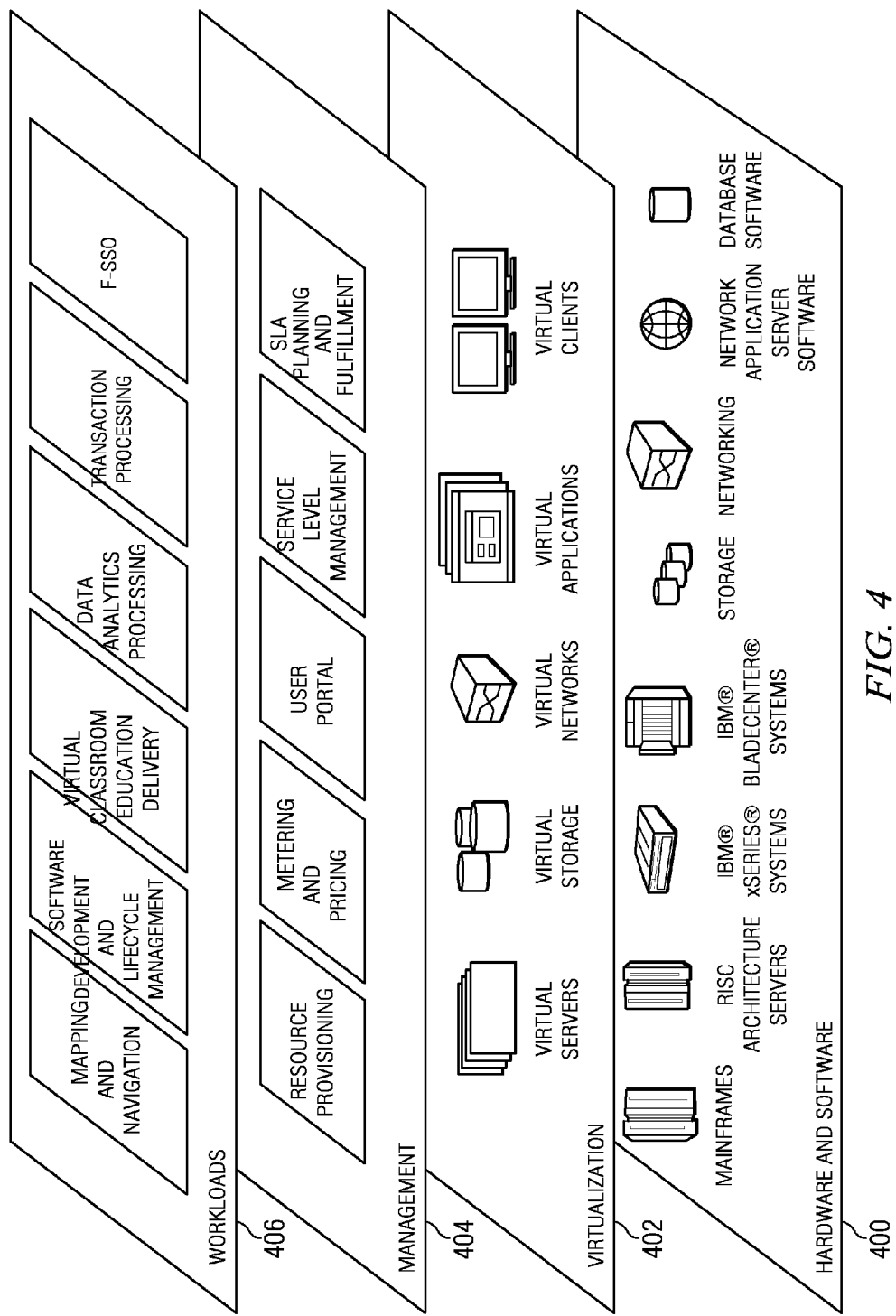
FIG. 4 depicts abstraction model layers of a cloud compute environment in which an identity provider discovery process may be implemented according to an embodiment of the invention.

Referring now to FIG. 4, by way of additional background, a set of functional abstraction layers provided by a cloud computing environment is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 402 provides an abstraction layer from which the following examples of virtual entities may be provided: virtual servers; virtual storage; virtual networks, including virtual private networks; virtual applications and operating systems; and virtual clients.

In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure, a cloud application to which a rich client desires to authenticate.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application 410 that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

By way of example only, a representative enterprise application deployed in the cloud is a client-server application such as IBM® LotusLive, which provides a cloud-delivered suite of technologies that combine web conferencing, messaging, and collaboration services with social networking capabilities in an easy-to-use web-based environment. As a component of IBM® LotusLive, LotusLive Notes® provides a full-featured email, calendaring, contact management, and instant messaging. A user can access the service directly over the Internet in a number of ways, such as using a web browser, or a "rich" client application (such as the Notes rich client). Using this service, an enterprise places in the cloud service its email, calendar and/or collaboration infrastructure, and a user uses the Notes client to access his or her email, perform a calendar operation, or facilitate an online collaboration. In a representative embodiment, the Notes rich client is Version 8.5.2 or higher.

The above example (using LotusLive) is merely representative. The techniques described below are not limited for use with a particular enterprise application deployed within the cloud environment.

Figure 5:
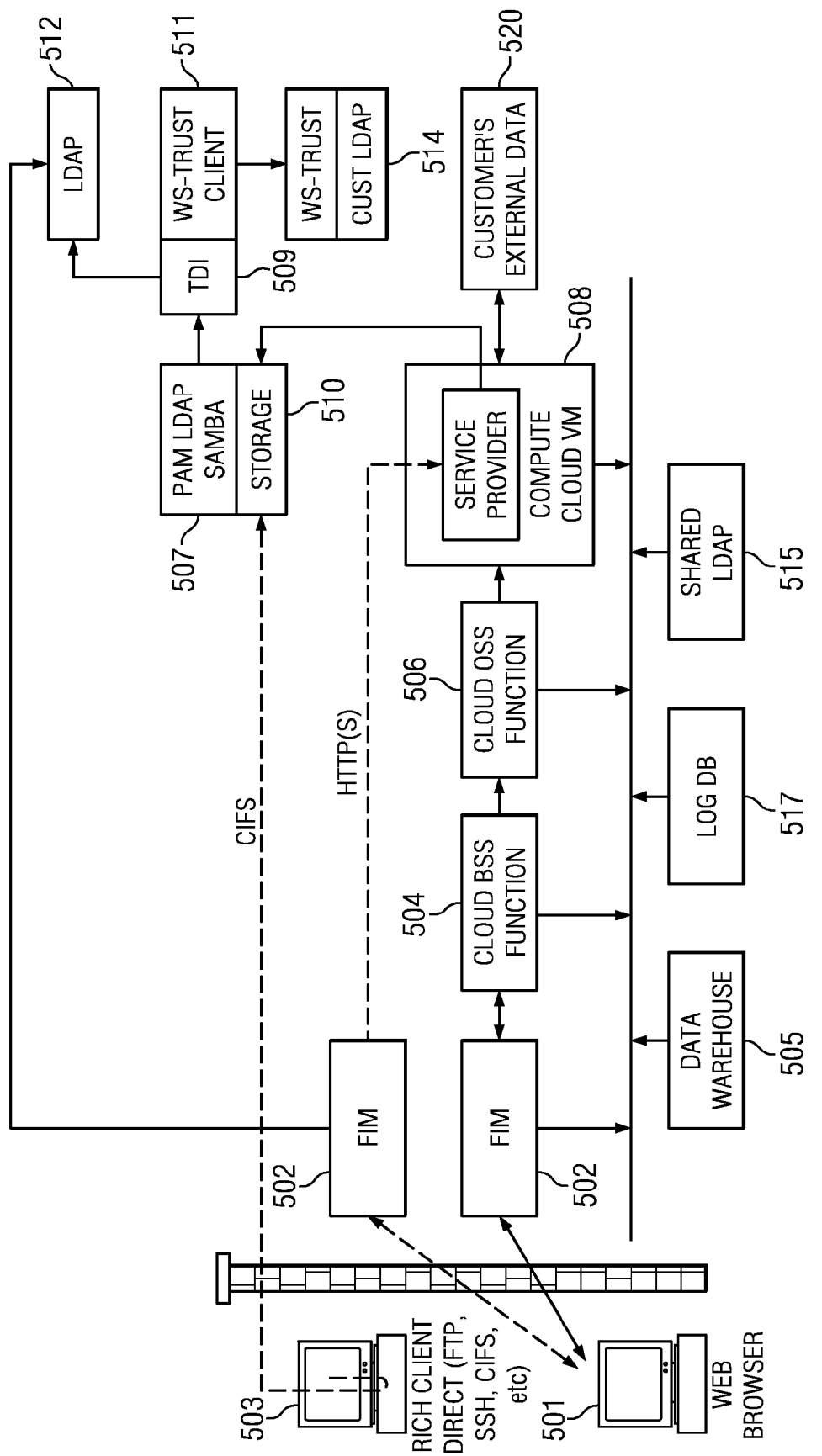
FIG. 5 is an exemplary block diagram illustrating a known cloud computing environment and the cloud resources allocated to a deployed customer application.

FIG. 5 illustrates a representative embodiment of the application upon its deployment. In this embodiment, the cloud provider 500 comprises a set of common management platform components. These components include one or more instances of the identity manager 502, the cloud BSS function 504, and the cloud OSS function 506, all of which were described above with respect to FIG. 4. The compute cloud 508 comprises the virtual machine instances that provide the computing infrastructure, including storage 510 used by the application. In this example, a set of common management platform components also comprise a pam_ldap module 507, which provides a means for Linux or UNIX servers and workstations to authenticate against LDAP directories, a directory integrator module (TDI) 509 that transforms and synchronizes identity data residing in heterogeneous directories, databases, files, collaborative systems and applications, a LDAP directory service 512, and a security token service (not shown). The security token service uses secure messaging mechanisms of Web Services Trust (WS-Trust) to define additional extensions for the issuance, exchange, and validation of security tokens. WS-Trust is an OASIS standard that enables security token interoperability by defining a request/response protocol. The WS-Trust protocol allows a Web service client to request of some trusted authority that a particular security token be exchange for another. To that end, a WS-Trust client 511 forms part of the common management and interfaces to a customer's LDAP 514 (through a customer side WS-Trust client) as shown. The customer's external data is supported in database 520. The common management platform also includes data warehouse 505, log database 517, and a shared LDAP 515. Client access is provided via a web browser 501 or via a "rich" client, i.e. a machine supporting a direct access client, such as CIFS (or the like). As shown, normally the identity manager component 502 interfaces to the cloud computing infrastructure via secure HTTP, while normally the rich client interfaces to the storage 510 via CIFS.

For those users who will have a U/P managed by the cloud provider 500, their F-SSO SAML assertion may include the U/P, or it may include a username only; in either case, the cloud provider presents the user with a simple interaction to establish a cloud-side password for access to cloud services. The user then has an account created at the cloud LDAP 512, and that account is marked as a "local authentication" user, and the user's password also is managed by LDAP. When the user attempts to access the storage 510, the pam_ldap module 507 intercepts the U/P and attempts to validate them. In this approach, a proxy (such as TDI 509) is the recipient of this U/P validation request. The proxy will first establish if this is a local user (and thus authenticates locally); if so, the proxy attempts to validate the U/P against the local LDAP 512. If the user is not a "local" user, however, the proxy generates a WS-Trust request and, using WS-Trust client 511, requests validation of the user's password from the user's identity provider (customer LDAP 514). In this approach, it is not required that the cloud provider manages a user's password, but it is still possible to do this for those customers that do not wish to establish a full proxy solution. In the above example, the use of WS-Trust is merely representative.

Authentication and Authorization Plug-In Model

With the above background, the subject matter herein is now described. As noted above, while cloud computing provides many advantages, data security is a major concern to cloud customers that desire to deploy their enterprise applications within a cloud environment. As the deployment shown in FIG. 5 illustrates, the customer's external data 520 necessarily is exposed to the cloud computing service provider. As a consequence, the integrity, confidentiality and privacy of the business information cannot be ensured absolutely.

The subject matter herein addresses and solves this problem.

Figure 6:
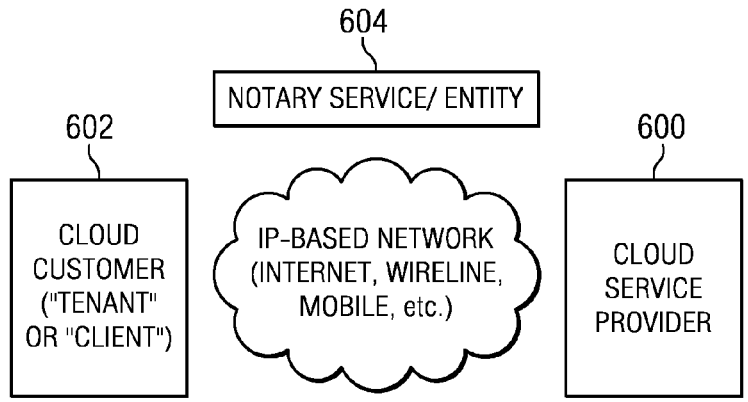
FIG. 6 illustrates an authentication and authorization model that ensures cloud computing platform security for customer data according to this disclosure.

As will be seen, the described subject matter may involve several entities, as seen in FIG. 6. A first entity 600 is the cloud service provider that establishes and maintains the cloud service, which is sometimes referred to as the cloud computing environment. Generally, this environment comprises a shared pool of configurable computing resources, such as illustrated in FIG. 4. A second entity is the cloud customer 602, which typically is an enterprise that rents some subset of the configurable resources to facilitate execution in the cloud of a customer application deployed in whole or in part in the cloud service. The cloud customer is sometimes referred to as a "tenant" or "client" of the cloud service provided by the cloud provider. The second entity in the example provided in FIG. 5 is an enterprise (such as a business entity) that desires to have its application (in the example, LotusLive) or portions thereof executed in the cloud. A third entity 604 is a notary service, which is an entity that is distinct and independent from the cloud service entity 600 and the cloud customers (such as customer 602). The notary may be a government entity that has been created to provide a notary function, or it may be a public or private entity. The cloud service provider and/or a cloud customer may have an association with the notary but, preferably, control over the notary is external to the other entities in the system. This separation of control enables the notary to act independently with respect to the cloud service provider 600, on the one hand, and the cloud customer 602, on the other hand. The basic function of the notary service is to manage enforcement of the resource group(s) that have been allocated to the customer 602 by the service provider 600 and, in particular, to ensure that those resource group(s) cannot be released to other entities (or back to the shared pool generally) except under particular circumstances that are enforced by the notary.

As described above, the notary service 604 acts as a certifier (or, more generally, an authoritative third party) that can attest, preferably in an automated manner, to an agreement among the customer 602, the cloud provider 600, and the notary. Among other provisions, that agreement provides that the resource group or groups (i.e., the cloud resources) assigned to the cloud customer 602 can only be released for use by another customer in certain circumstances. One example circumstance is that both the cloud environment administrator (a person or automated process associated with the cloud service provider 600) and the cloud customer administrator login to approve the release of such cloud resources, conditioned further upon a requirement that the contents (e.g., the customer's business information) be erased before such release. Another example circumstance is receipt of a login of a permitted notary user (a person or automated process associated with the notary 604) and the cloud environment administrator, which may occur in the event of the customer's breach of some obligation under the cloud service agreement. Even in this latter scenario, however, the release of the resource group is conditioned upon erasure of the (now former) customer's information.

The approach involving the notary service ensures that the cloud environment administrator cannot unilaterally take back resources allocated to the customer and/or view customer-sensitive information, even in the event the customer breaches the service agreement and is to be terminated as a customer.

Figure 7:
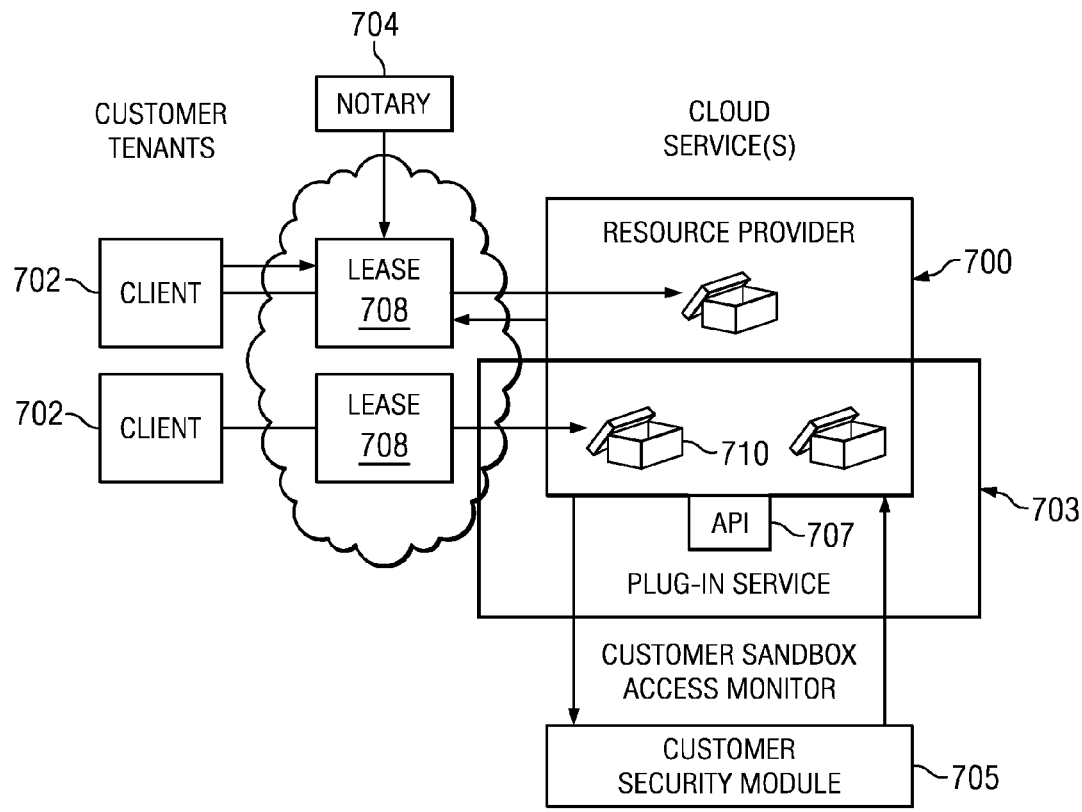
FIG. 7 illustrates how a customer-specific authentication and authorization module is plugged into the cloud infrastructure according to this disclosure.

According to another aspect of this disclosure, an authentication and authorization "plug-in" model is implemented within the cloud computing environment. This is illustrated in FIG. 7. This plug-in security model replaces or supplements the current security paradigm which, as noted above with respect to FIG. 5, potentially exposes the customer's application data to security risks. In this aspect, as illustrated in FIG. 7, the cloud service provider 700 provides a way for the customer 702 (illustrated as the "client" in this figure) to turn up the customer's own authentication and/or authorization module 705. As noted above, the system also includes the notary 704 that facilitates creation and enforcement of agreements (each shown as a lease 708). A lease 708 is associated with a resource sandbox 710, which is a set of one or more resources among the shared pool. The authentication and/or authorization module 705 enforces the respective authentication and/or authorization functions desired to be implemented by the customer even though the application itself is deployed in the cloud. In other words, the customer's own authentication and/or authorization schemes are enforced in the cloud but without the cloud service provider's involvement directly. To this end, the cloud service provider plug-in service 703 enables the module 705 to be plugged into the cloud service, but the cloud provider's access to that module 705 is restricted. In particular, there is no Super User ID (or other cloud system access) rights granted to the cloud service provider; rather, access to the customer's data is enforced via the module 705, and cloud environment administrator is not registered with the User Registry (or its equivalent) within or associated with the module 705. The cloud service provider allocates a resource group to the administrator of the cloud customer (or such resource group is allocated automatically upon registration of the module), but the service provider is not restricted—by virtue of the plug-in module architecture generally and by inhibiting user registration in particular—from obtaining permitted access to the customer's data. Thus, the cloud environment administrator is not able to access the resources assigned to the cloud customer.

The cloud's operating system (platform) runtime security invokes the customer's authentication and authorization module 705 as needed. To facilitate this plug-in architecture, the cloud service provides an application programming interface (API) 707. The API 707 implements a pluggable authentication module (PAM) scheme, which is a known technique to integrate multiple low-level authentication schemes (such as module 705) into a high-level application programming interface. PAM allows programs that rely upon authentication to be written independent of an underlying authentication system. For further details regarding pluggable authentication modules, the reader is directed to Open Software Foundation Request for Comment (RFC) 86.0, dated October, 1995. An alternative approach is to implement operating system (OS) pluggable security, such as Linux OS kernel-loadable modules, or the like. Any other plug-in architecture may be utilized.

Figure 8:
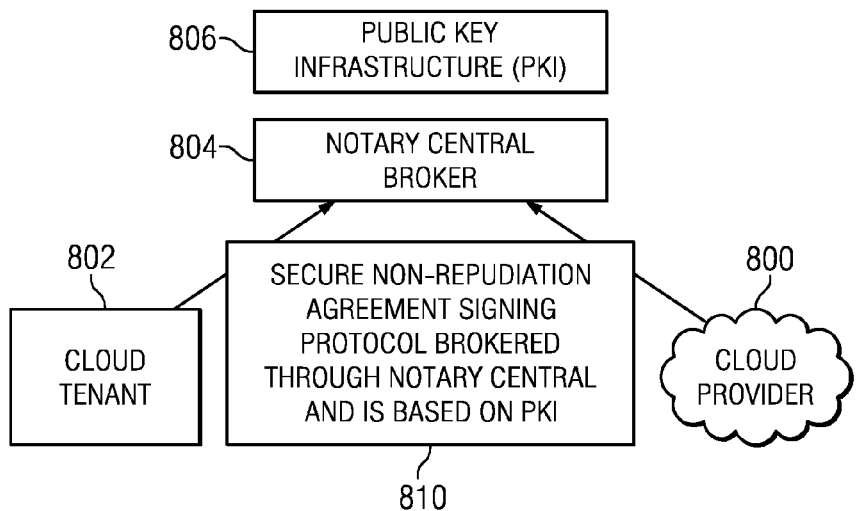
FIG. 8 illustrates how a notary service interacts with the cloud tenant and the cloud provider to facilitate the formation of a secure, electronic and non-repudiated lease for a resource group.

FIG. 8 is a block diagram illustrating how the notary service 804 interacts with the cloud service provider 800 and the cloud tenant 802. Preferably, the notary service is implemented as an automated electronic process or set of processes executing within a computing environment. It may comprise one or more machines, servers, applications, processes, programs and utilities. The notary service 804 is associated with (or has access to) public key infrastructure (PKI) 806 that implements or enforces known public key cryptographic protocols and techniques such as digital signatures, public key certificates, public-key cryptosystems, and the like. As illustrated in FIG. 8, the notary service 804 facilitates (brokers) a secure, non-repudiation digital signature protocol by which an agreement 810 is established. By using known PKI schemes, the agreement 810 is not subject to repudiation by either the cloud provider 800 or the cloud tenant 802. The notary service 804 maintains the executed agreement in a data store, and the notary preferably is the only entity (among the cloud provider 800, and the tenant 802) recognized as having the right to enforce or disclose the terms of the agreement. Various known cryptographic protocols and schemes can be used to create, maintain and enforce the agreement in this manner.

In particular, during provisioning a tenant is associated with a unique PKI certificate. The PKI infrastructure 806 interacts with the notary 804 during the process of certificate provisioning for the tenant to create an association between the tenant and the tenant's PKI certificate. This association is established securely. When it becomes necessary for the notary 804 to provide the agreement or evidence thereof (e.g., to a Court), the PKI system enables a Court (or other permitted government or enforcement entity) to verify the association between the tenant and the tenant's PKI certificate to thereby establish non-repudiation of the original signatures under which the agreement was formed. The PKI mechanisms ensure that the tenant cannot deny the secure association and, in particular, its signature on the document (which is typically a digital signature).

Figure 9:
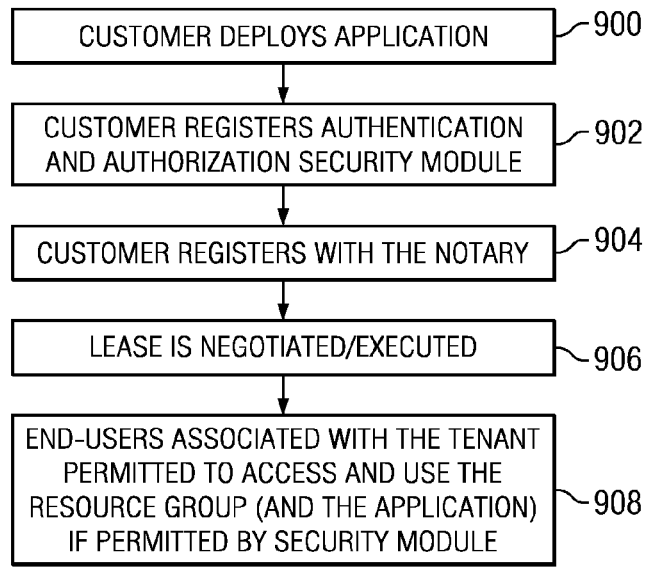
FIG. 9 illustrates a typical use scenario for the system.

With the above as background, and with reference to FIG. 9, the following describes various use scenarios. These scenarios are merely representative.

The cloud service provider has a cloud environment administrator that allocates one or more resource groups for customers that deploy applications to the cloud environment. A resource group comprises a set of one or more cloud computing resources, and such resources may be quite varied. Typically, the resources comprise processors (CPUs), disk drives (DASD), and memory. When a customer deploys an application, which is step 900, the cloud environment administrator allocates a resource group (e.g., processors, storage, and memory) for the customer's application and data. At step 902, the customer registers its authentication and authorization security module with the cloud security service. As described above, that customer-specific security module is then used to control what persons or entities can access information associated with the deployed application. The cloud environment administrator, however, is not registered (as a permitted user) within the customer's security module; thus, the cloud environment administrator is not able to access (or release to others, or to the cloud's general resource pool) the resources assigned to the cloud customer (even though the administrator itself assigned those resources) or the associated business information. At step 904, the tenant registers with the notary, and the secure agreement is negotiated (formed) in step 906. The order of the above steps is merely representative, and one or more of these steps may be carried out concurrently or in a different sequence. At step 908, end-users associated with the cloud tenant are permitted to access and use the application provided they have been authenticated and/or authorized by the customer-specific security module.

An alternative scenario begins when the tenant makes a request to the cloud service provider for a resource. In response, the cloud service provider prepares a contract, which is then digitally-signed by the tenant, the provider, and the notary. Once the contract is signed, the service provider allocates the resource to the client, and the client then sets up its authentication/authorization mechanism through the plug-in service interface. Because the client sets up resource permission for client-only access, only end-users who validly authenticate through the plug-in module can access the resource. The provider, as noted, is restricted from any such access. If, later, the client violates the agreement or the contract expires, the service provider then issues a request to the notary for permission to remove the resource from the client. The notary then gives permission to the service provider to revoke the resource, and the service provider erases the customer's data and returns the resource to the shared pool (or assigns it to another client). In an alternative to the default scenario, the client itself may give up the resource by removing a permission assigned to the resource (in its security module). In such case, once the service provider receives notice that the client itself has removed the permission, the service provider may have the limited right to assign a default permission for the resource. This default provision might then enable the service provider to access its own resource, perhaps for management or other support activity.

The agreement among the participating entities ensures that the tenant's business information remains secure. Thus, for example, among other provisions, the agreement entered into by the tenant and the service provider provides that the resource group or groups (i.e., the cloud resources) assigned to the cloud customer can only be released for use by another customer in certain circumstances. One example circumstance is that both the cloud environment administrator and the cloud customer administrator login to approve the release, conditioned further upon a requirement that the contents (e.g., the customer's business information) be erased before such release. Another example circumstance is receipt of a login of a permitted notary user and the cloud environment administrator, which may occur in the event of the customer's breach of some obligation under the cloud service agreement. Even in this scenario, however, the release of the resource group is conditioned upon erasure of the (now former) customer's information.

Thus, if the client decides to discontinue the cloud usage, its customer data is cleared from provider storage prior to the lease to use the service being revoked or terminated, which renovation or termination can occur only with the notary's prior approval. That approval preferably is obtained securely and in a manner that cannot be repudiated by any of the parties to the transaction.

If the cloud service provider is acquired by a third party, the tenant can decide whether it wants to continue the cloud usage with the new owner, but it need not worry that its data is compromised. The new owner will not have access to that data unless and until the tenant provides such permission through the security module that only the tenant manages and controls.

The plug-in security model and the use of the independent notary service ensure that the enterprise customer's information is secure. The plug-in model allows the cloud computing customer to retain control over their enterprise information when it deploys its enterprise application and information in the cloud. The notary model protects the privacy and the access right of the customer when their application software and information are deployed in the cloud.

The technique can be used within the context of a public cloud, a private cloud, or a hybrid (public-private) cloud.

The client's plug-in (i.e., the customer security module) is installed on each machine that is used for enforcement. As noted in the above example scenarios, the plug-in may be installed before or after the contract is negotiated. Of course, and as shown in FIG. 7, any number of clients may use the technique concurrently, provided that the one client is restricted from accessing another client's resource. To this end, the cloud provider sandboxes the resources that are allocated to a particular client (and associated with a particular agreement).

In the described example, the customer security module is unique to a particular customer, although this is not a requirement. In an alternative scenario, the service provider itself makes available a security module that it "leases" to the client. Whether the client or the provider provides the security module, as noted above, it is the client that should control (by properly mapping authorized users to resources) which of its users are able to access the negotiated cloud resources (via the security module).

In the embodiment described above, the agreement is enforced using PKI, which enables non-repudiation. This is not a limitation, however, as other techniques may be used to enforce the agreement. Thus, for example, in an alternative embodiment, another distinct entity may be used for this purpose. This entity, referred to as "court" entity (analogous to a Court of Law) has its own public/private key pair, as well as a digital certificate. The agreement might then be executed as follows. The tenant encrypts the text of the agreement using its secret key. The cloud provider encrypts the same agreement using its secret key. The court entity then signs an aggregation of the two encrypted documents. To verify the agreement, the reverse process is carried out. In particular, the court uses its public key to verify its signature on the aggregated document (the two encrypted agreements). The court then uses the provider's public key to decrypt the first part of the aggregated document, and tenant's public key to decrypt the second part of the aggregated document. The court entity then presents the two documents to the notary.

Support services with respect to the cloud resources may be provided by the service provider or the customer. Thus, for example, during the lease period, and if the tenant has complete control over the machine, the client can perform any necessary maintenance (e.g., software patches), perhaps under the provider's direction. When the client gives up the machine or resources therein (by unplugging their security module or by changing access policy), the provider can restore a resource to a known good state using conventional backup/restore facilities. If desired, the client may also elect to install and maintain its own virtual operating system (OS) image; as an alternative, the provider can provide the client a temporary OS image that the client can update while the lease remains in effect.

When the lease ends (e.g., by expiration of the term, or upon a breach by the client), the provider takes back the resources by removing the customer's security plug-in (or inhibiting the customer's use of any generic module that may be in use). As a consequence, and because the provider owns the resource, default security mechanism(s) are activated, thereby enabling the provider to regain full access. While the agreement is in place, the security plug-in prevents the provider from accessing any resource that is the subject of the agreement. Although not required, preferably the notary and/or the client is provided a notification in the event the provider tries to access (or take some other inappropriate action with respect to) the resources in violation of the agreement. Rather, the provider should first seek permission to do so from the notary. Once any such permission is obtained, the provider can revoke the client's access, as has been described.

To facilitate return of the compute resources, the notary may have a "key" (or similar mechanism) that uninstalls the plug-in as necessary. In particular, in the event of a client violation, the notary provides the service provider the key (or a certificate) to enable return of the resources to the shared pool. The use of such a key, however, is not always required. For example, in the case where the client uses the provider's hardware and OS resources only and then later breaks the contract, the provider (once a permission is obtained from the notary) need only backup the client's data and then re-boot and re-format the impacted disk. In the scenario where the client also installs its own virtual machine and then later breaks the contract, the provider (once permission is obtained) can access the hypervisor (upon which the VM executes) and remove the VM. In these cases, the provider retains sufficient access to the underlying resources to facilitate the removal operation, although in no event will the provider have access to applications within the client's virtual machines.

In contrast, a well-behaved client will remove the security plug-in on its own (e.g., upon termination of the agreement).

The described subject matter has numerous advantages. With the approach, the cloud customer does not relinquish control of their enterprise information when they subscribe to the cloud environment. The approach ensures that the cloud environment administrator (or some other unauthorized person or entity) cannot take back resource groups (or, more generally, one or more cloud resources) that have been allocated to the customer without permission of the customer or a permitted third party associated with the notary service. In this manner, the cloud customer has total control of their information in the cloud computing environment, and there is no material risk that a cloud administrator or other entity can access the customer's information without permission or authority. If the cloud service provider is acquired by a new cloud company, or even if hardware resources are stolen, the customer's information remains protected, as that information can only be accessed and viewed by means of the customer's own authentication and authorization security plug-in (i.e., by passing the customer's authentication and/or authorization checks). Advantageously, neither the cloud administrator nor any other person or entity has Super User ID in the operating system of the cloud environment for accessing or otherwise managing customer data.

The notary service provides additional advantages. As noted, the notary service helps to ensure that the customer's data remains secure, as it is used to enforce an agreement (among the customer, the cloud provider, and the notary) that ensures that the resources in which that data is located can only be released under given circumstances. If either party breaches the agreement, the other party can revoke the contract through the notary, which acts as an independent certifier that can attest to the contract. This approach ensures that the cloud environment administrator cannot unilaterally take back resources allocated to the customer and/or view customer-sensitive information, even in the event the customer breaches the service agreement and is to be terminated as a customer. On the other hand, the use of the notary service also ensures that the customer cannot take advantage of the cloud provider unreasonably, such as by breaching the provider's services agreement and still receiving the cloud services.

The technique provides a new security paradigm for a cloud computing that ensures protection of customer information. Cloud service customers manage their own security authorization and authorization services by plugging into the cloud's plug-in model. A government or third party security service (the notary) supervises the security policy execution within the environment in a manner that balances the interests of all participants.

The plug-in and notary service functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the plug-in or notary service functions may be hosted within or external to the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data can be configured into a data structure (e.g., an array, a linked list, etc.) and stored in a data store, such as computer memory. Furthermore, as noted above, the identity provider instance discovery functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the plug-in and notary service components are implemented in a special purpose computer, preferably in software executed by one or more processors. Associated data for use therein is stored in an associated data store. The software also is maintained in one or more data stores or memories associated with the one or more processors, and the software may be implemented as one or more computer programs.

The plug-in function may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The references herein to "plug-in" should not be considered as limiting. The basic function provided by the plug-in is intercepting security checks. Thus, generally, the plug-in is any code that functions to intercept security checks.

Having described our invention, what we now claim is as follows:

1. A method for authentication and authorization in an environment wherein computing resources are hosted in a shared pool of configurable computing resources, comprising:
    receiving a request from a first entity for access to the shared pool of configurable computing resources managed by a second entity;
    upon execution of an agreement among the first entity, the second entity and a third entity that is distinct from the first entity and the second entity, assigning the first entity a resource group;
    registering a plug-in security module associated with the first entity in a plug-in service operated by the second entity in association with the shared pool of configurable computing resources;
    restricting access to the resource group except via the plug-in security module;
    upon occurrence of an event, returning the resource group to the shared pool by:
        issuing a request to the third party, the request seeking permission to disassociate the first entity from the resource group; and
        receiving a response from the third party, the response indicating that the second entity has permission to disassociate the first entity from the resource group.

2. The method as described in claim 1 further including receiving and storing in the resource group information associated with permitted users of the first entity.

3. The method as described in claim 2 further including deleting the information associated with permitted users of the first entity prior to returning the resource group to the shared pool.

4. The method as described in claim 1 wherein the agreement is secured cryptographically so that it cannot be repudiated by either the first entity or the second entity.

5. Apparatus for authentication and authorization in an environment wherein computing resources are hosted in a shared pool of configurable computing resources, comprising:
    a processor;
    computer memory holding computer program instructions that when executed by the processor perform a method comprising:
        receiving a request from a first entity for access to the shared pool of configurable computing resources managed by a second entity;
        upon execution of an agreement among the first entity, the second entity and a third entity that is distinct from the first entity and the second entity, assigning the first entity a resource group;
        registering a plug-in security module associated with the first entity in a plug-in service operated by the second entity in association with the shared pool of configurable computing resources;
        restricting access to the resource group except via the plug-in security module; and
        upon occurrence of an event, returning the resource group to the shared pool by:
            issuing a request to the third party, the request seeking permission to disassociate the first entity from the resource group; and
            receiving a response from the third party, the response indicating that the second entity has permission to disassociate the first entity from the resource group.

6. The apparatus as described in claim 5 wherein the method further includes receiving and storing in the resource group information associated with permitted users of the first entity.

7. The apparatus as described in claim 5 wherein the method further includes deleting the information associated with permitted users of the first entity prior to returning the resource group to the shared pool.

8. The apparatus as described in claim 5 wherein the agreement is secured cryptographically so that it cannot be repudiated by either the first entity or the second entity.

9. A computer program product in a non-transitory computer readable medium for use in a data processing system for authentication and authorization in an environment wherein computing resources are hosted in a shared pool of configurable computing resources, the computer program product holding computer program instructions which, when executed by the data processing system, perform a method comprising:
    receiving a request from a first entity for access to the shared pool of configurable computing resources managed by a second entity;
    upon execution of an agreement among the first entity, the second entity and a third entity that is distinct from the first entity and the second entity, assigning the first entity a resource group;
    registering a plug-in security module associated with the first entity in a plug-in service operated by the second entity in association with the shared pool of configurable computing resources;
    restricting access to the resource group except via the plug-in security module;
    upon occurrence of an event, returning the resource group to the shared pool by:
        issuing a request to the third party, the request seeking permission to disassociate the first entity from the resource group; and
        receiving a response from the third party, the response indicating that the second entity has permission to disassociate the first entity from the resource group.

10. The computer program product as described in claim 9 wherein the method further includes receiving and storing in the resource group information associated with permitted users of the first entity.

11. The computer program product as described in claim 9 wherein the method further includes deleting the information associated with permitted users of the first entity prior to returning the resource group to the shared pool.

12. The computer program product as described in claim 9 wherein the agreement is secured cryptographically so that it cannot be repudiated by either the first entity or the second entity.

13. Apparatus operated in a shared pool of configurable computing resources, comprising:
   a processor;
   computer memory holding computer program instructions executed by the processor (i) to provide an application programming interface (API) that receives, as plug-ins, first and second security modules, the first security module being associated with a first client of the shared pool of configurable computing resources, the second security module being associated with a second client of the shared pool of configurable computing resources, (ii) to allocate to each of the first and second clients, first and second resource groups, wherein access to the first resource group is restricted except as permitted by the first security module, wherein access to the second resource group is restricted except as permitted by the second security module, and (iii) to return a resource group to the shared pool upon a given occurrence that is one of: (a) receiving an indication from the first party that a permission associated with the first resource group has been removed, and (b) receiving an indication from a third party that vouches for the return of the receiving group.

14. The apparatus as described in claim 13 wherein the computer program instructions are executed by the processor (iv) to delete any client-specific information from the resource group prior to returning the resource group to the shared pool.

* * * * *